(No Model.)  2 Sheets—Sheet 1.
L. LEVIN.
TRICYCLE.
No. 417,428.  Patented Dec. 17, 1889.
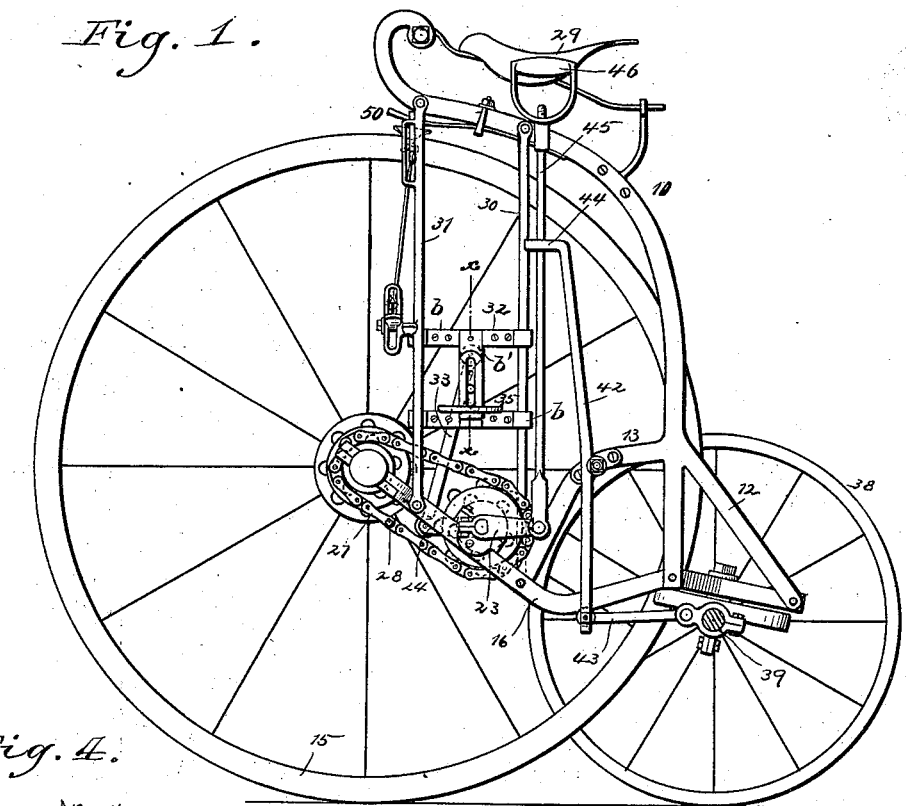
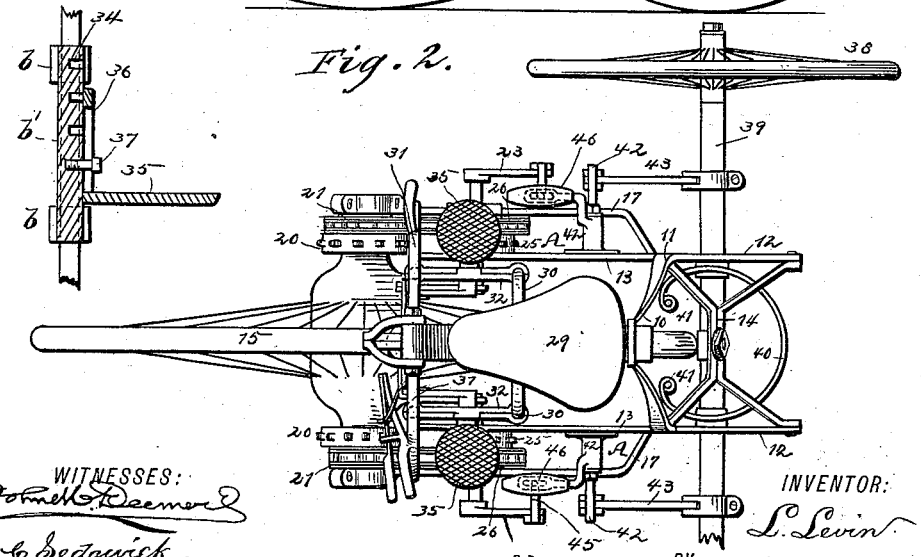
WITNESSES:  INVENTOR:
  L. Levin
BY
  Munn & Co.
ATTORNEYS.

(No Model.)　　　　　　　　　　　　　　　　2 Sheets—Sheet 2.
L. LEVIN.
TRICYCLE.

No. 417,428.　　　　　　　　　Patented Dec. 17, 1889.

WITNESSES:　　　　　　　　　　　　INVENTOR:
　　　　　　　　　　　　　　　　　　L. Levin
　　　　　　　　　　　　　　　BY Munn & Co.
　　　　　　　　　　　　　　　　　ATTORNEYS.

UNITED STATES PATENT OFFICE.

LEONHARD LEVIN, OF SAN FRANCISCO, CALIFORNIA.

TRICYCLE.

SPECIFICATION forming part of Letters Patent No. 417,428, dated December 17, 1889.

Application filed April 13, 1889. Serial No. 307,093. (No model.)

*To all whom it may concern:*

Be it known that I, LEONHARD LEVIN, of San Francisco, in the county of San Francisco and State of California, have invented a new and useful Improvement in Tricycles and Similar Vehicles, of which the following is a full, clear, and exact description.

My invention relates to an improvement in tricycles and similar vehicles, and has for its object to improve the construction of the tricycle for which application for Letters Patent was made by myself March 18, 1887, Serial No. 231,407, which application was allowed May 24, 1887.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 3:
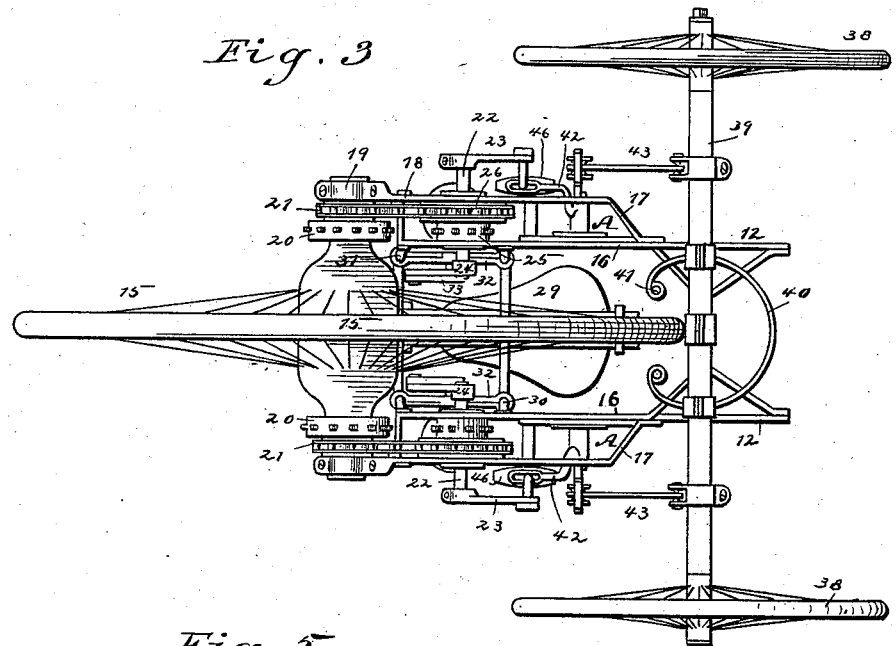
Figure 5:
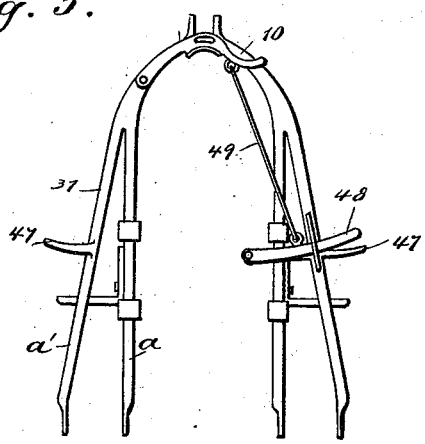

Figure 1 is a side elevation of a tricycle having my improvement applied thereto. Fig. 2 is a plan view of the same. Fig. 3 is a bottom plan view. Fig. 4 is a section on line x x of Fig. 1, and Fig. 5 is a detail section of that portion of the frame upon which the driving mechanism carrying the foot-step is held to slide.

The backbone 10 of the frame is bifurcated at its lower end, as shown at 11 in Fig. 2, and each member of the lower end of the said backbone is provided with a rearwardly-extending arm 12 and a forwardly-projecting arm 13, as illustrated in Fig. 1.

The base of the vehicle-frame at the back is made to partake, essentially, of the form of the letter X, as illustrated at 14 in Fig. 2, and the said base-frame is carried forward at each side of the front wheel 15, as shown at 16 in Fig. 3, which wheel is journaled in the frame in a manner hereinafter described. The arms 12 of the backbone are attached to the rear extremities of the base-frame of the machine, and the forward arms 13 of the backbone are likewise secured to the said base-frame between the center and the forward end of the same. The base-frame is completed by adding a strap or bar 17 to the inwardly-extending members at the outer side, which straps or bars 17, one being located at each side of the base-frame, are spaced from the forwardly-extending members thereof, as shown at A in Figs. 2 and 3. The rear end of each of the straps or bars 17 is bent inward and connected to the lower end of the main portion of the backbone, and also to the inwardly-extending members of the main frame proper. The forward end of each of the forwardly-extending members of the main frame proper is bent outward at a right angle, as illustrated at 18 in Fig. 3, and bolted or otherwise secured at or near the forward end of the straps or bars 17, and upon the said inner extremity of each of the said straps or bars a suitable bearing 19 is formed, of any approved construction, in which the trunnions or axle of the forward or main drive-wheel 15 of the vehicle or machine is journaled. The said drive-wheel is provided with the ordinary rubber tire.

Upon the axle of the forward drive-wheel 15, between each of the bearings 19 and the hub of the wheel, two sprocket-wheels 20 and 21 are rigidly secured, the outer sprocket-wheel 21 being of less circumference than the inner wheel 20, and upon the upper face of the bars 17 and the inwardly-extending members of the main base-frame a shaft 22 is journaled in suitable bearings, one shaft being located at each side of the forward drive-wheel in horizontal alignment with each other. The extremities of the shafts 22 extend outward beyond each side of the base-frame and are provided with crank-arms 23 and 24. The said crank-arms are made to project from the several ends of the shafts 22 in opposite directions, and upon each shaft 22 within the space A of the base-frame two sprocket-wheels 25 and 26 are journaled, the inner sprocket-wheel 25 being smaller than the outer wheel 26. Thus the small sprocket-wheel 25 is brought in longitudinal alignment with the large sprocket-wheel 20 upon the wheel shaft or axle and the large sprocket-wheel 26 in corresponding alignment with the smaller sprocket-wheel 21, secured to the said drive-wheel axle, as fully illustrated in Fig. 3. One of the sprocket-wheels—the smaller 21, for instance—upon the drive-wheel axle is connected with the larger sprocket-wheel 26 upon the shaft 22 through the medium of an endless chain belt 27, and the said chain belt is capable of being removed from the said wheels at any time without removing the latter from their support by passing a bolt through two contacting links of the chain and providing the said bolt with a nut 28, as illustrated in Fig. 1. The two sizes of sprocket-wheels are provided for the shafts 22 and the axle of the forward drive-wheel, in order that by shifting the chain belts 27 from one set of wheels to the other the forward wheel may be driven fast or slow, as required, when the shafts 22 are rotated.

The backbone 10 is provided with a saddle 29, of any approved construction, and from said backbone a round standard 30 is projected downward to a connection with the base-frame, preferably at a point where the inwardly-extending arms 13 are secured to the frame, and in advance of the round standard 30 a second round and bifurcated standard 31 is carried downward from the backbone, as illustrated in detail in Fig. 5, one member of said standard being attached to the outer face of the bars 17 of the base-frame and the other standard to the inner face of the forwardly-extending members 16 of the main base-frame. The inner members $a$ of the bifurcated standards 31 are parallel with the standards 30, and upon each of the said members $a$ and the standards 30 a cross-head 32 is held to slide, each cross-head at the back being pivotally connected with one of the inner crank-arms 24 of the shafts 22 by a connecting-rod 33. Thus as the shafts 22 are revolved the cross-heads are made to travel vertically upon the member $a$ of the standards 31 and upon the standard 30, or when the cross-heads are depressed the said shafts will be rotated.

The cross heads 32 consist of two parallel horizontal bars $b$, as illustrated in Fig. 1, connected by a vertical bar $b'$, and the outer face of the said vertical bar of the cross-head is provided with a series of apertures 34, as best shown in Fig. 4. Upon the outer apertured face of this vertical bar of the cross-head a step 35, adapted for the reception of the rider's foot, is attached, being provided to that end with an arm 36, longitudinally slotted, extending upward at a right angle from the inner edge, and the said step is adjustably secured to the cross-head by passing a bolt or pin 37 through the slot in the arm 36 and into one of the apertures 34 in the vertical bar $b'$. By this means the step 35 may be raised or lowered to accommodate any rider.

The machine is provided with two small rear wheels 38, connected by an axle 39, which axle is swiveled to the rear cross portion 14 of the base-frame, as illustrated in Figs. 2 and 3, and the movement of the rear axle is limited by a circular guide-bar 40, secured to the upper face thereof, between the inner ends of which the forward drive-wheel passes, and each inner end of the guide is provided with a vertical pin or stud 41, adapted to engage with the inner face of the forwardly-extending member of the main base-frame. Thus the movement of the axle in either direction is limited by a contact with the said pins or studs 41 with the said base-frame.

A lever 42 is fulcrumed upon the outer face of each of the forwardly-extending arms 13 of the backbone, and the lower end of each lever 42 is connected with the rear axle 39 by a link 43. The upper extremity of each lever 42 is made to incline a short distance forward, so as to be substantially in vertical alignment with the saddle, and is made to terminate in an eye 44, through which eye a hand-bar 45 is downwardly projected to a connection with the outer crank-arm 23 of each of the shafts 22. The said hand-bar is provided at its upper end with a handle 46, which handle projects upward, preferably slightly beyond the saddle, as shown in Fig. 1. It will thus be observed that in operation the machine can be propelled both by foot and hand power by the rider pressing with his feet upon the steps 35 and pulling upward with his hands upon the hand-bars 45.

It will be readily understood that when the steps of the machine are depressed the corresponding hand-bars will be drawn upward. It will also be readily understood that the machine may be quickly steered by the hand-bars, even while in operation, by carrying the same either to the front or to the rear of the machine, which will cause the levers 42 to act directly upon the rear axle and carry the same in one direction or another, as occasion may demand.

The outer member $a'$ of each of the bifurcated standards 31 is provided with a foot-rest 47, as shown in Fig. 5, and the member $a$ of one standard 31 is further provided with a foot-lever 48, attached by a rod 49 to a brake 50, located beneath the backbone and adapted to bear upon the tire of the front drive-wheel.

Having thus described my invention, I claim as new and desire to secure by Letters Patent—

1. In a velocipede, the combination, with the two parallel vertical guide-rods 30 and 31, forming part of the frame, of the horizontal crossheads or bars $b\ b$, sliding on said guide-rods, the vertical bar $b'$, connecting said bars $b$ and provided with apertures, as specified, the step 35, having a vertical slotted arm 36, and an adjustable bolt 37, for securing the step in any required vertical adjustment, as shown and described.

2. In a tricycle or similar machine, the combination, with a frame, a large front wheel journaled in the said frame, drive-shafts also journaled upon the frame, and a connection between the drive-shafts and the axle of the front wheel, of a rear axle carrying small wheels swiveled to the rear portion of the frame, a hand-rod attached to each drive-shaft, levers fulcrumed upon the frame and attached to the said hand-rods, and a link-connection between the levers and the rear axle, all combined for operation substantially as shown and described.

3. In a tricycle or similar machine, the combination, with a frame, a large front wheel journaled in the said frame, drive-shafts also journaled upon the frame, and a connection between the drive-shafts and the axle of the front wheel, of a rear axle swiveled to the rear of the frame and provided with a curved guide-bar having a vertical pin or stud secured to each inner end adapted for contact with the frame, small wheels journaled upon the said rear axle, a hand-rod pivotally attached to each drive-shaft, levers fulcrumed upon the frame and connected with the hand-rods, and a link-connection between the said levers and the rear axle, substantially as shown and described.

LEONHARD LEVIN.

Witnesses:
CHAS. A. WAGNER,
JOHN H. LANDKAMP.